(12) United States Patent
Kim (10) Patent No.: US 10,215,253 B2
(45) Date of Patent: Feb. 26, 2019

(54) NOZZLE PLATE OF ENGINE MOUNT

(71) Applicant: Hyundai Motor Company, Seoul (KR)

(72) Inventor: Hyo-Seok Kim, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 148 days.

(21) Appl. No.: 15/364,108

(22) Filed: Nov. 29, 2016

(65) Prior Publication Data

US 2018/0051769 A1    Feb. 22, 2018

(30) Foreign Application Priority Data

Aug. 18, 2016  (KR) .................. 10-2016-0104660

(51) Int. Cl.
*B60K 5/12* (2006.01)
*F16F 13/10* (2006.01)

(52) U.S. Cl.
CPC .......... *F16F 13/107* (2013.01); *F16F 13/106* (2013.01); *B60K 5/1208* (2013.01); *F16F 13/10* (2013.01)

(58) Field of Classification Search
CPC .. F16F 13/08; F16F 13/10; F16F 13/18; F16F 13/106; F16F 13/107; F16F 13/262; F16F 13/268; F16F 9/34; B60K 5/1208
USPC ........................ 267/140.13, 35, 219, 140.4
See application file for complete search history.

(56) References Cited

U.S. PATENT DOCUMENTS

| | | | | |
|---|---|---|---|---|
| 4,938,463 A * | 7/1990 | Miyamoto | ............ | F16F 13/106 267/140.13 |
| 6,435,488 B1 * | 8/2002 | Simuttis | .................. | F16F 13/18 267/140.14 |
| 2002/0000688 A1 * | 1/2002 | Simuttis | .................. | F16F 13/10 267/140.13 |
| 2003/0178755 A1 * | 9/2003 | Rudolf | .................. | F16F 13/101 267/140.13 |
| 2007/0138718 A1 * | 6/2007 | Muraoka | ............... | F16F 13/105 267/140.14 |
| 2009/0140477 A1 * | 6/2009 | Michiyama | ........... | F16F 13/106 267/121 |
| 2010/0201053 A1 * | 8/2010 | Okumura | .............. | F16F 13/106 267/140.13 |
| 2010/0301529 A1 * | 12/2010 | Garety | .................. | F16F 13/108 267/140.13 |

(Continued)

FOREIGN PATENT DOCUMENTS

JP      4167556 B2    10/2008
JP      5225923 B2     7/2013
(Continued)

*Primary Examiner* — Robert A. Siconolfi
*Assistant Examiner* — San M Aung
(74) *Attorney, Agent, or Firm* — Morgan, Lewis & Bockius LLP (57) ABSTRACT

A nozzle plate of an engine mount may include a lower nozzle plate, an upper nozzle plate, a membrane, and a stopper, in which a flow of the hydraulic liquid is allowed through a gap formed between the stopper and the membrane and a gap formed between the membrane and a seating portion of the lower nozzle plate when pressure of the hydraulic liquid applied to the membrane is relatively low, and a flow of the hydraulic liquid is blocked as the membrane comes into close contact with the stopper or the seating portion when pressure of the hydraulic liquid is relatively high.

10 Claims, 6 Drawing Sheets

(56) References Cited

U.S. PATENT DOCUMENTS

| | | | | |
|---|---|---|---|---|
| 2012/0205846 A1* | 8/2012 | Schaefer | ............... | F16F 13/103 |
| | | | | 267/140.13 |
| 2012/0242019 A1* | 9/2012 | Koyama | ............... | F16F 13/105 |
| | | | | 267/140.14 |
| 2016/0195154 A1* | 7/2016 | Komiya | ................ | F16F 13/106 |
| | | | | 267/140.13 |

FOREIGN PATENT DOCUMENTS

| KR | 10-0907056 B1 | 7/2009 |
|---|---|---|
| KR | 10-1596713 B1 | 2/2016 |

\* cited by examiner

UPPER
ENTRANCE HOLE

NOZZLE PLATE OF ENGINE MOUNT

CROSS-REFERENCE TO RELATED APPLICATIONS

The present application claims priority to Korean Patent Application No. 10-2016-0104660, filed on Aug. 18, 2016, the entire contents of which is incorporated herein for all purposes by this reference.

BACKGROUND OF THE INVENTION

Field of the Invention

The present invention relates to a nozzle plate of a hydraulic engine mount in which a hydraulic liquid is encapsulated and flows between an upper liquid chamber and a lower liquid chamber through a flow path formed in the nozzle plate, and more particularly, to a nozzle plate of an engine mount, which is capable of suppressing rattling noise of a membrane that is mounted on the nozzle plate and vibrates when a hydraulic liquid flows.

Description of Related Art

A hydraulic engine mount is configured to attenuate vibration in a high frequency region and a low frequency region, and widely used for various types of vehicles.

Figure 1:
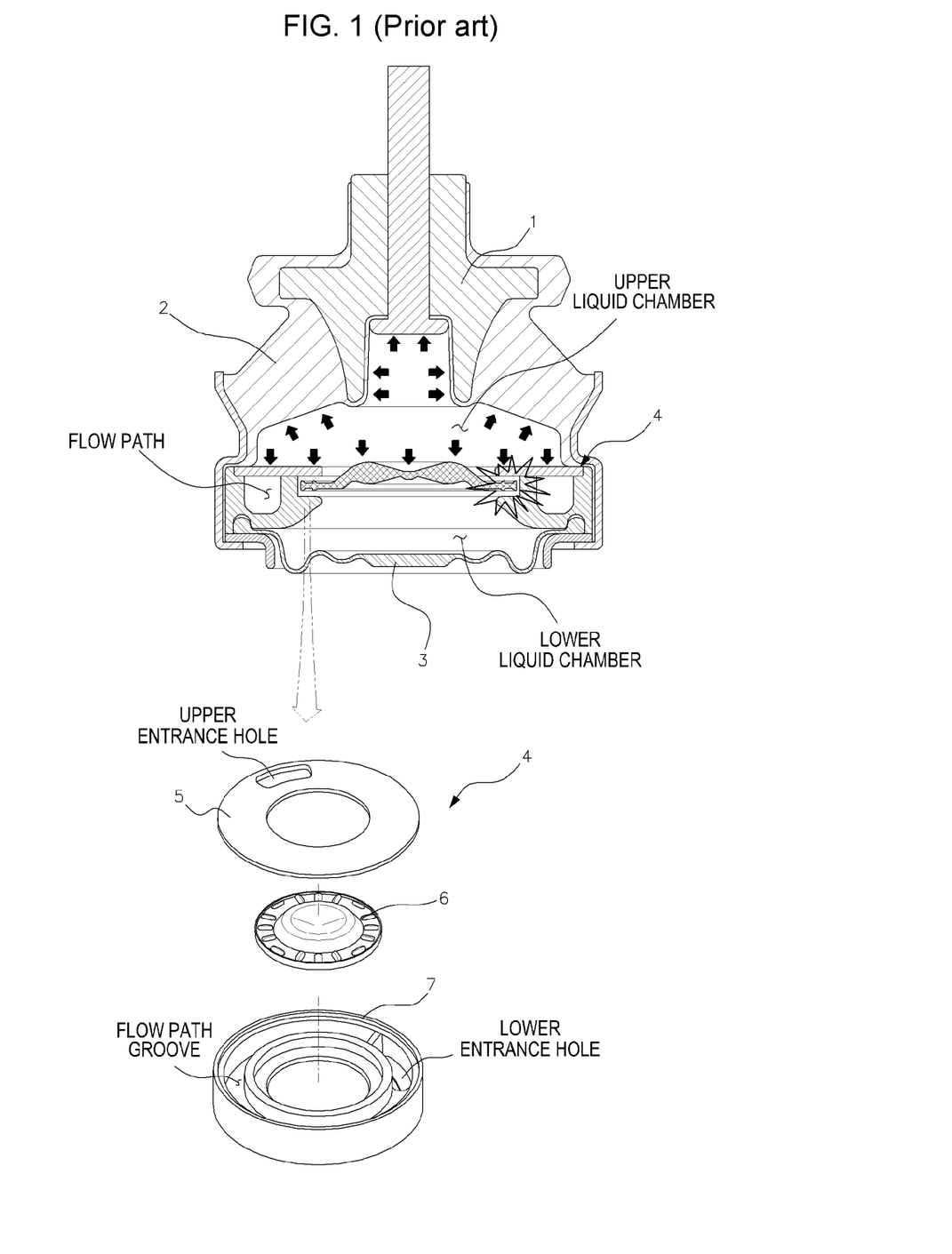
FIG. 1 is a longitudinal cross-sectional view illustrating a state of an interior of a hydraulic mount in the related art and a view illustrating a state in which a nozzle plate is disassembled.

FIG. 1 illustrates a state of an interior of a hydraulic engine mount (hereinafter, referred to as "engine mount") in the related art. Referring to FIG. 1, the engine mount has an internal space provided between an insulator 2 and a diaphragm 3, the predetermined amount of hydraulic liquid is encapsulated in the internal space, and the internal space is divided into an upper liquid chamber and a lower liquid chamber by a nozzle plate 4 mounted in the internal space.

The nozzle plate 4 is configured by coupling an upper nozzle plate 5, a lower nozzle plate 7, and a membrane 6, and a flow path is formed in the upper nozzle plate 5 and the lower nozzle plate 7 so that the hydraulic liquid may flow through the flow path.

That is, a circular flow path groove is formed in an upper surface of the lower nozzle plate 7, and the upper nozzle plate 5 is coupled onto the lower nozzle plate 7 so as to cover an upper side of the flow path groove, thereby forming the flow path. Further, a lower entrance hole and an upper entrance hole, which communicate with the flow path groove, are formed in the lower nozzle plate 7 and the upper nozzle plate 5, respectively, at both side ends of the flow path groove. Therefore, the flow path communicates with the lower liquid chamber through the lower entrance hole, and communicates with the upper liquid chamber through the upper entrance hole.

The membrane 6, which vibrates when the hydraulic liquid flows, is selectively mounted between the upper nozzle plate 5 and the lower nozzle plate 7. The membrane 6 is mounted such that a rim portion thereof is engaged between the upper nozzle plate 5 and the lower nozzle plate 7, and each of the upper nozzle plate 5 and the lower nozzle plate 7 has a shape having an opening hole so that the hydraulic liquid in the upper liquid chamber and the lower liquid chamber is in contact with the membrane.

With a change in load of an engine which is transmitted through a core 1, the insulator 2 is elastically deformed, and thus a volume of the upper liquid chamber is changed, and as a result, the hydraulic liquid flows between the upper liquid chamber and the lower liquid chamber through the flow path. In this case, in addition to the flow path, when the membrane vibrates, the hydraulic liquid flows through a gap formed at a portion where the membrane is engaged.

That is, in a situation in which large displacement behavior is inputted such as when a vehicle suddenly accelerates or travels on a rough road, the hydraulic liquid flows through the flow path so as to generate a relatively high damping value, and in a situation in which small displacement vibration is inputted such as when the vehicle travels on a normal road or an engine idles, the hydraulic liquid flows through the gap and the membrane vibrates, thereby generating a damping value.

However, in the case of a structure in the related art, there is a problem in that the rim portion of the membrane strikes the upper nozzle plate 5 and the lower nozzle plate 7 when the membrane vibrates, and as a result, abnormal noise occurs. To inhibit the occurrence of the abnormal noise, a method of reducing a clearance by increasing a thickness of a portion where the membrane 6 is engaged (semifixed membrane), or a method of completely fixing the membrane so that no clearance is formed (integrated membrane) is used in the related art.

However, there are problems in that if the thickness of the portion where the membrane is engaged is increased, a magnitude of abnormal noise is reduced, but dynamic characteristics are increased, and as a result, Noise, vibration, harshness (NVH) performance deteriorates, and the structure in which the rim portion of the membrane 6 is fixed to the nozzle plate 4 degrades damping efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a nozzle plate of an engine mount capable of inhibiting the occurrence of abnormal noise of the membrane without causing deterioration in the NVH performance and damping efficiency.

The present invention provides a nozzle plate of an engine mount, which is mounted in the engine mount in which a hydraulic liquid is encapsulated, and divides an interior of the engine mount into an upper liquid chamber and a lower liquid chamber, the nozzle plate including: a lower nozzle plate which has a lower stepped portion formed to be spaced apart from a flow path groove toward a center of the lower nozzle plate, a seating portion formed to be spaced apart from the lower stepped portion toward the center of the lower nozzle plate, and a protrusion portion protruding from the seating portion; an upper nozzle plate which has a ring shape formed with an opening hole at a center thereof, has an upper stepped portion, and is coupled to the lower nozzle plate from the upper side of the lower nozzle plate so as to cover an upper side of the flow path groove and form a flow path; a membrane which has an outer rim portion engaged between the upper stepped portion and the lower stepped portion, a central portion seated on the seating portion, and a fastening hole into which the protrusion portion is fitted when the central portion is seated on the seating portion; and a stopper which is coupled to an end of the protrusion portion and prevents the membrane from being withdrawn, in which a flow of the hydraulic liquid is allowed through a gap formed between the stopper and the membrane and a gap formed between the membrane and the seating portion when pressure of the hydraulic liquid applied to the membrane when the hydraulic liquid flows is relatively low, and a flow of the hydraulic liquid is blocked as the membrane comes into close contact with the stopper or the seating portion when pressure of the hydraulic liquid is relatively high.

In the present invention, a slit may be additionally formed at an edge of the fastening hole so that the membrane is easily and elastically deformed in accordance with pressure of the hydraulic liquid. Four slits may be disposed to extend radially with the fastening hole disposed at a center thereof.

A circular rib with a partially increased thickness may be formed to surround the slit and the fastening hole disposed therein in order to prevent a size of the slit from being increased due to repeated elastic deformation of the membrane.

In the exemplary embodiment of the present invention, a first catching projection on which the membrane is seated may be formed around the protrusion portion, and a second catching projection on which the stopper is seated may be formed at an upper end of the protrusion portion. Further, the stopper may have a circular plate shape having a through hole formed at a center thereof, and when the stopper is seated on the second catching projection, a fastening means (such as a nut or a rivet) may be coupled and fixed to an end of the protrusion portion.

Lower opening holes may be formed in the lower nozzle plate in a direction from the lower stepped portion to the center of the lower nozzle plate, and the seating portion may be positioned at a center of the lower opening holes and connected with the lower stepped portion through bridges that extend radially from the seating portion.

A plurality of protrusions may be formed on a portion of the lower nozzle plate where the upper nozzle plate and the lower nozzle plate are in direct contact with each other, and protrusion holes may be formed in the upper nozzle plate so that the protrusion holes and the protrusions are fitted with and coupled to each other. When the protrusions are fitted into the protrusion holes, the membrane may be engaged between the upper stepped portion and the lower stepped portion so that the membrane is elastically compressed.

As a selective exemplary embodiment, in order to improve a flow of the hydraulic liquid, a part of the membrane, which is positioned between the stopper and the seating portion among parts of the membrane, may have a tapered shape which has a thickness that gradually decreases toward the center of the membrane. As another selective exemplary embodiment, a part of the membrane, which is positioned between the stopper and the seating portion among parts of the membrane, may have a shape formed with a stepped portion which has a small thickness at a portion relatively close to the center of the membrane and a large thickness at a portion relatively distant from the center of the membrane.

The present invention having the aforementioned configurations is made by collecting only the advantage of a semifixed membrane (this is advantageous in improving dynamic characteristics because a fluid flow is absorbed) and the advantage of an integrated membrane (this is advantageous in inhibiting the occurrence of abnormal noise because relative motion between the membrane and the nozzle plate does not occur), and as a result, it is possible to improve dynamic characteristics, increase NVH performance, and inhibit the occurrence of abnormal noise.

That is, it is possible to inhibit the occurrence of abnormal noise and increase damping performance by blocking or allowing the flow of the hydraulic liquid (via the membrane) in accordance with an operating state of the engine and/or a traveling state.

In the present invention, the membrane may be easily and elastically deformed since the slits, which extend from the fastening hole, are additionally provided, and it is possible to inhibit the slit from being additionally torn since the rib is formed to surround the slits.

The two catching projections are formed on the protrusion portion, and as a result, the stopper and the membrane may be easily seated. Further, the part of the membrane positioned between the stopper and the seating portion has a tapered shape or a stepped portion, and as a result, it is possible to partially reduce a thickness of the membrane, and allow the hydraulic liquid to flow more smoothly.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A part irrelevant to the description will be omitted to clearly describe the present invention, and the same or similar constituent elements will be designated by the same reference numerals throughout the specification.

Terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

The present invention relates to a nozzle plate of an engine mount, which is mounted in the engine mount in which a hydraulic liquid is encapsulated, and divides an internal space between an insulator and a diaphragm into an upper liquid chamber and a lower liquid chamber, and hereinafter, an exemplary embodiment of the present invention will be described in more detail with reference to the drawings.

Figure 2:
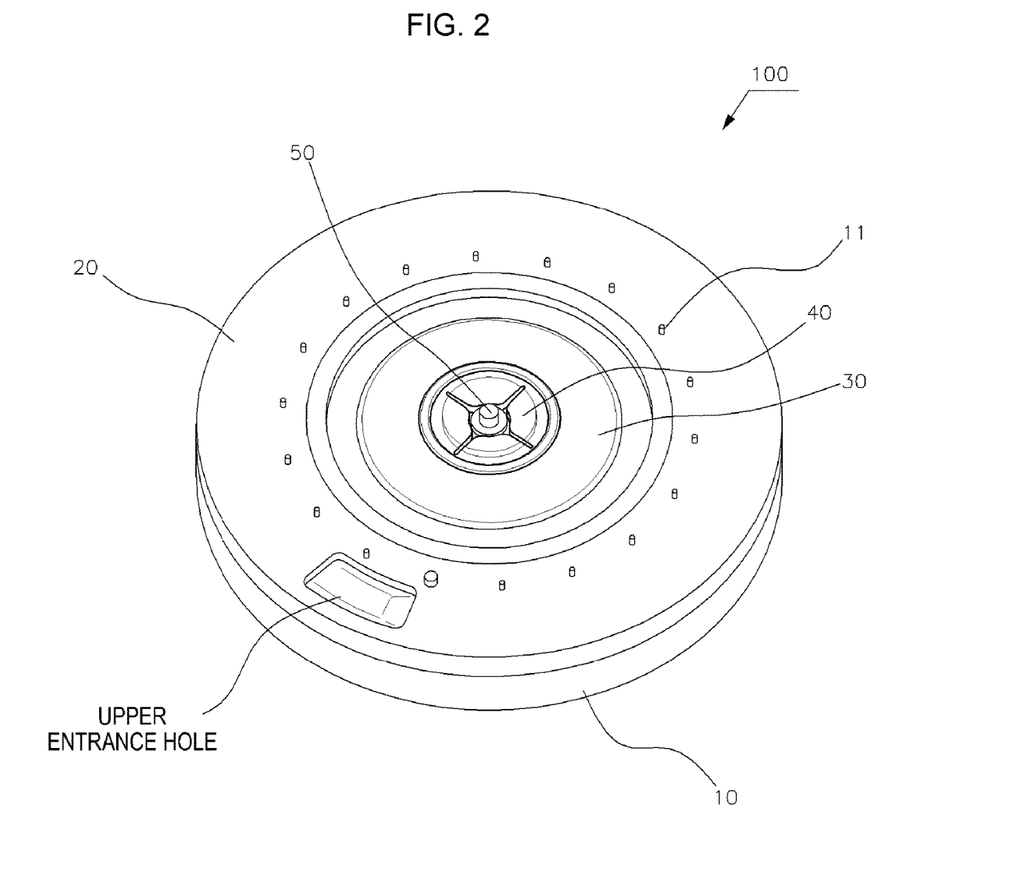
FIG. 2 is a perspective view of a nozzle plate according to an exemplary embodiment of the present invention.
Figure 3:
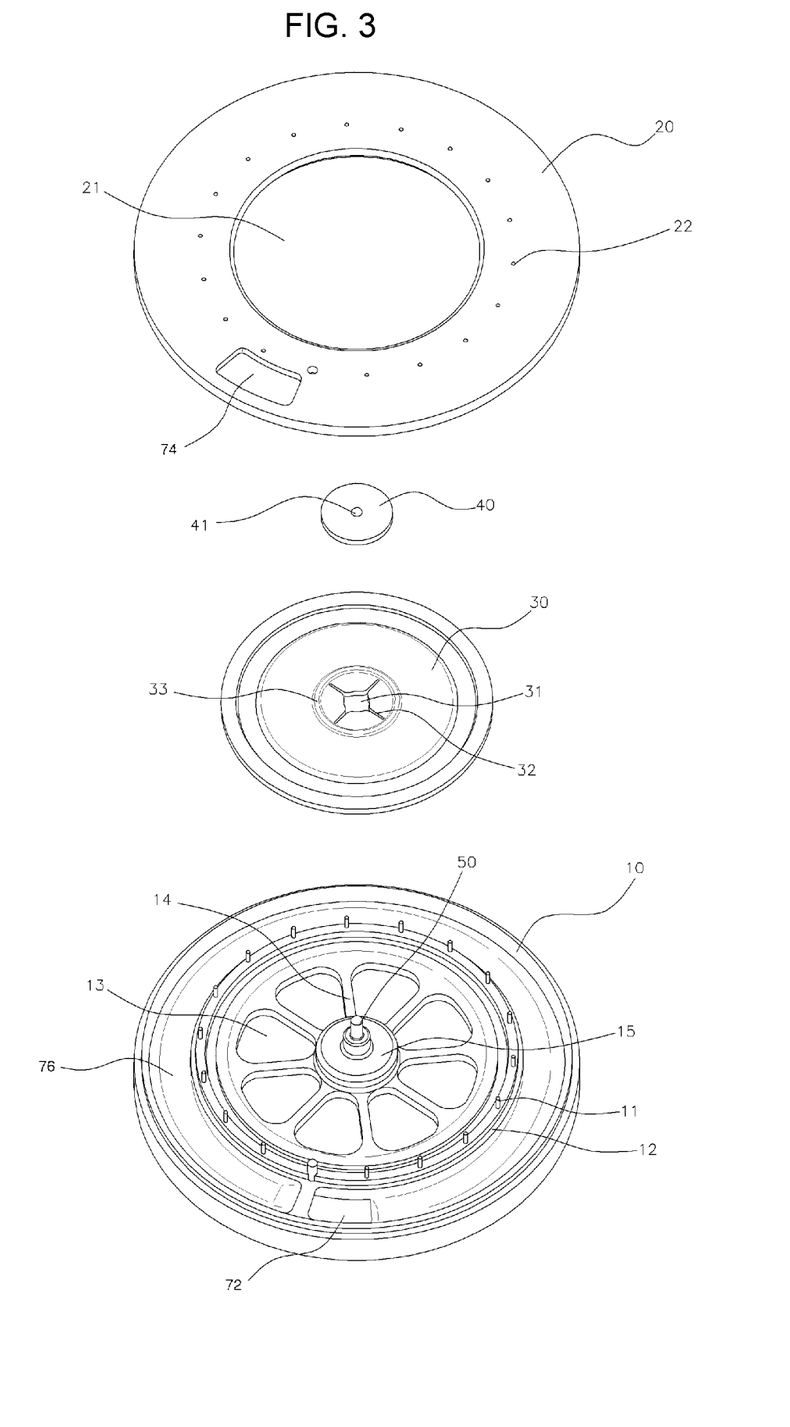
FIG. 3 is a view illustrating a state in which the nozzle plate in FIG. 2 is disassembled.

As illustrated in FIGS. 2 and 3, a nozzle plate 100 according to an exemplary embodiment of the present invention is configured by coupling an upper nozzle plate 20, a lower nozzle plate 10, a membrane 30, and a stopper 40, and like the structure in the related art, when the upper nozzle plate 20, the lower nozzle plate 10, the membrane 30, and the stopper 40 are coupled, a flow path is formed in the upper nozzle plate 20 and the lower nozzle plate 10 so that the hydraulic liquid may flow through the flow path.

Figure 4:
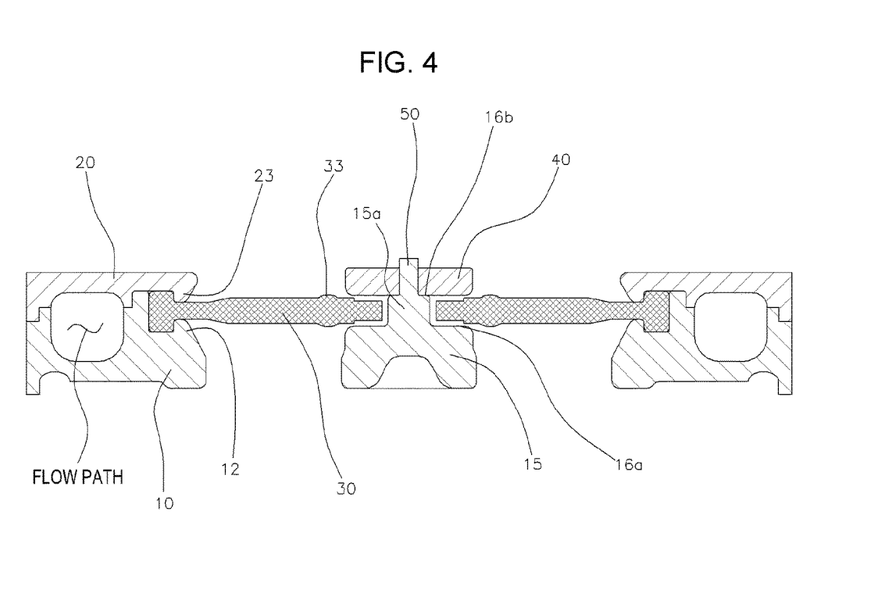
FIG. 4 is a view illustrating a cross section of the nozzle plate in FIG. 2.

Referring to FIGS. 3 and 4, in the lower nozzle plate 10 according to an exemplary embodiment of the present invention, a lower entrance hole 72 is formed at one end of a flow path groove 76, a lower stepped portion 12 is formed to be spaced apart from the flow path groove toward a center of the lower nozzle plate 10, a seating portion 15 is formed to be spaced apart from the lower stepped portion 12 toward the center of the lower nozzle plate 10, and a protrusion portion 15a protrudes from the seating portion 15.

A first catching projection 16a on which the membrane 30 is seated is formed around the protrusion portion 15a, and a second catching projection 16b on which the stopper 40 is seated is formed at an upper end of the protrusion portion 15a. Further, the stopper 40 has a circular plate shape having a through hole 41 formed at a center thereof, and when the stopper 40 is seated on the second catching projection 16b, a fastening device 50 such as a nut or a rivet is coupled and fixed to an end of the protrusion portion 15a.

As illustrated in FIG. 3, lower opening holes 13 are formed in the lower nozzle plate 10 in a direction from the lower stepped portion 12 to the center of the lower nozzle plate 10, and the seating portion 15 is positioned at a center of the lower opening holes and configured to be connected with the lower stepped portion 12 through bridges 14 that extend radially from the seating portion 15.

The upper nozzle plate 20 has a ring shape having an opening hole 21 at a center thereof, and is coupled to the lower nozzle plate 10 from the upper side of the lower nozzle plate 10 so as to cover an upper side of the flow path groove and thus form a flow path. Further, an upper stepped portion 23 is formed, and an upper entrance hole 74, which communicates with the flow path, is formed.

A rim portion of the membrane 30 is engaged between the upper stepped portion 23 and the lower stepped portion 12, and a central portion of the membrane 30 is seated on the first catching projection 16a of the seating portion 15, and a fastening hole 31 into which the protrusion portion is fitted when the membrane 30 is seated on the first catching projection 16a is formed. Slits 32 are additionally formed at an edge of the fastening hole 31 of the membrane 30 so that the membrane 30 is easily and elastically deformed in accordance with pressure of the hydraulic liquid (a flow rate of the hydraulic liquid is increased). In the exemplary embodiment of the present invention, four slits 32 are disposed to extend radially with the fastening hole 31 disposed at a center thereof.

In order to prevent a size of the slit 32 from being increased due to repeated elastic deformation of the membrane 30, a circular rib 33 with a partially increased thickness is formed to surround the slits 32 and the fastening hole 31 disposed therein.

After the membrane 30 and the stopper 40 are sequentially seated, the fastening device 50 such as a nut or a rivet is coupled and fixed to the end of the protrusion portion 15a, thereby preventing the stopper 40 and the membrane 30 from being withdrawn.

A plurality of protrusions 11 is formed on a portion of the lower nozzle plate 10 where the upper nozzle plate 20 and the lower nozzle plate 10 are in direct contact with each other, and protrusion holes 22 are formed in the upper nozzle plate 20 so that the protrusion holes 22 and the protrusions 11 are fitted with and coupled to each other. When the protrusions 11 are fitted into the protrusion holes 22, the rim portion of the membrane 30 is engaged between the upper stepped portion 23 and the lower stepped portion 12, as illustrated in FIG. 4, so that the rim portion of the membrane 30 is elastically compressed.

Figure 5:
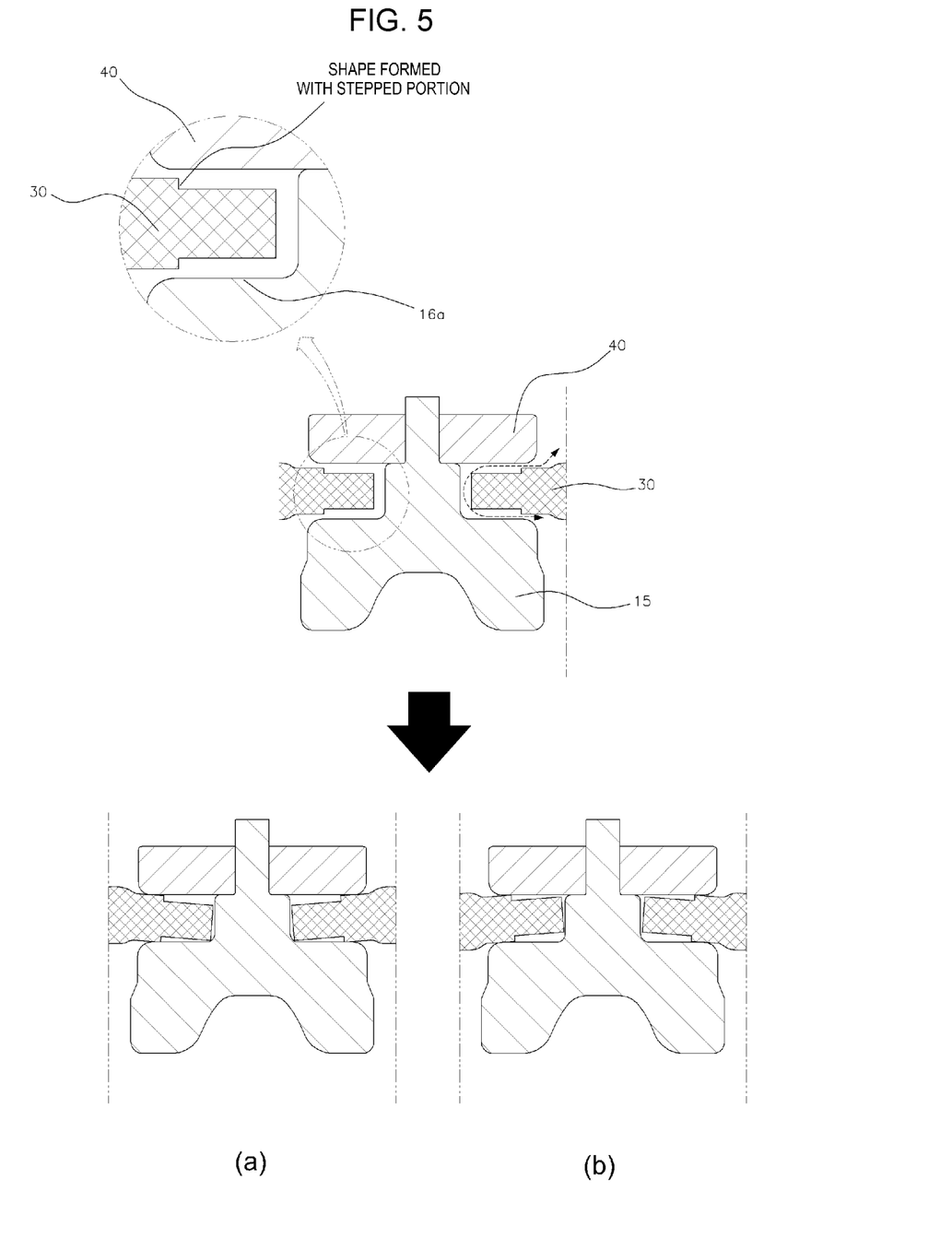
FIG. 5 is a view illustrating a state in which a part of the membrane, which is positioned between a seating portion and a stopper among parts of a membrane, is enlarged, and a stepped portion is formed at the part positioned between the seating portion and the stopper.

As illustrated in FIG. 5, the nozzle plate 100 according to an exemplary embodiment of the present invention, which has the aforementioned configurations, allows the hydraulic liquid to flow through a gap formed between the stopper 40 and the membrane 30 and a gap formed between the membrane 30 and the seating portion 15 when pressure of the hydraulic liquid applied to the membrane 30 when the hydraulic liquid flows is relatively low (see dotted lines in FIGS. 5 and 6), but blocks a flow of the hydraulic liquid as the membrane 30 comes into close contact with the stopper 40 (see FIGS. 5B and 6D) or the seating portion 15 (see FIGS. 5A and 6C) when pressure of the hydraulic liquid is relatively high.

Figure 6:
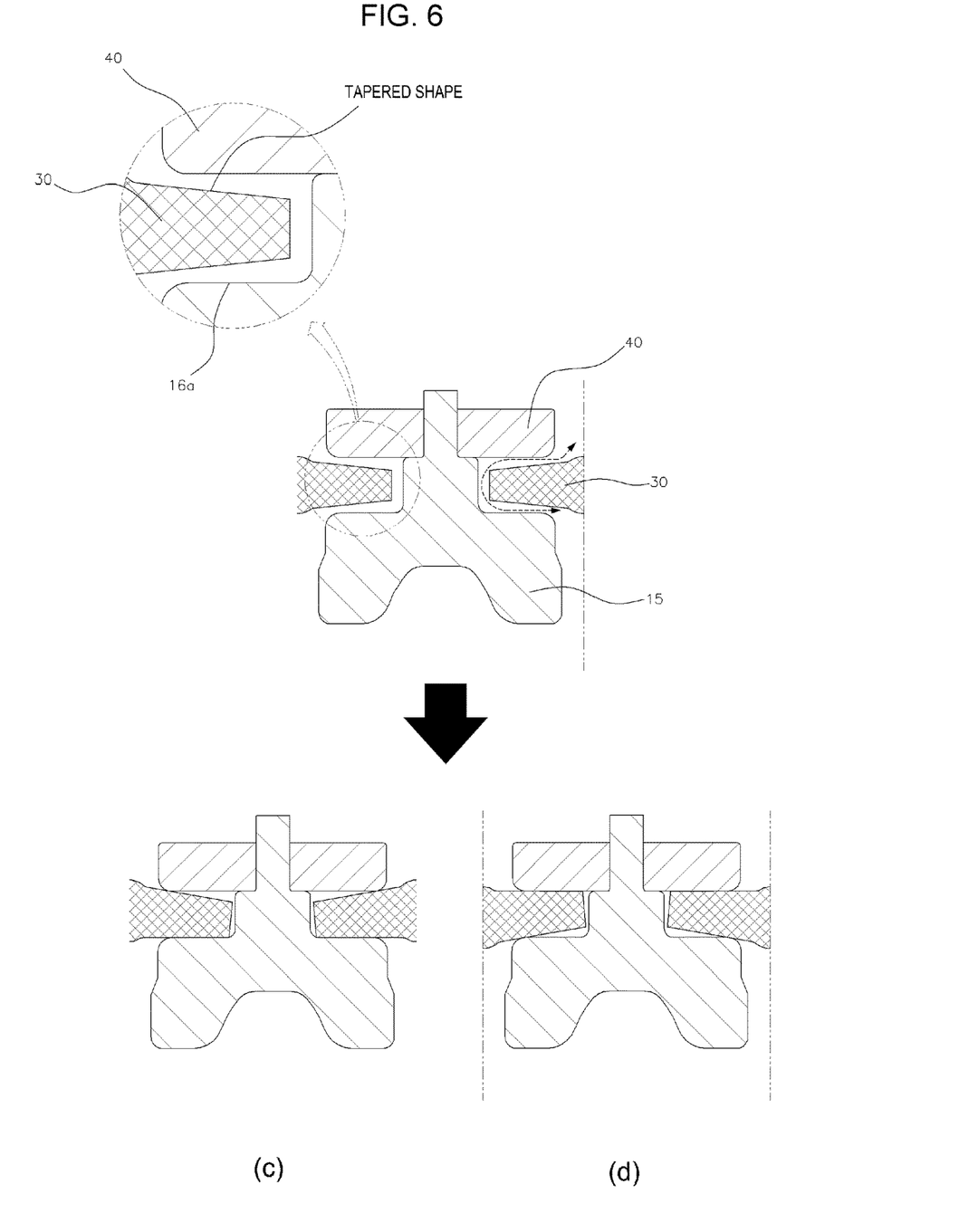
FIG. 6 is a view illustrating a state in which the part of the membrane, which is positioned between the seating portion and the stopper among the parts of the membrane, is enlarged, and the part positioned between the seating portion and the stopper is formed in a tapered shape.

Meanwhile, in an exemplary embodiment of the present invention, in order to improve a flow of the hydraulic liquid and at least partially reduce a thickness of the membrane, a part of the membrane 30, which is positioned between the stopper 40 and the seating portion 15 among parts of the membrane 30, may have a shape formed with a stepped portion which has a small thickness at a portion relatively close to the center of the membrane 30 and a large thickness at a portion relatively distant from the center of the membrane 30 as illustrated in FIG. 5, or may have a tapered shape which has a thickness that gradually decreases toward the center of the membrane 30 as illustrated in FIG. 6.

In the case of the nozzle plate 100 according to an exemplary embodiment of the present invention, the rim portion of the membrane 30 is engaged between the upper nozzle plate 20 and the lower nozzle plate 10 to the extent that the rim portion is elastically deformed, and as a result, it is possible to basically remove rattling noise in the related art. Further, the small amount of hydraulic liquid flows through the fastening hole 31 and the slits 32 when the membrane 30 vibrates vertically, and as a result, it is possible to generate damping force that copes with small displacement vibration like a state in which the engine idles.

In a case in which large displacement vibration occurs, the membrane 30 comes into close contact with the stopper 40 or the seating portion 15, and at the same time, a flow of the fluid through the fastening hole 31 and the slits 32 is blocked, and gradual contact is induced as pressure, which brings the membrane 30 into close contact with the stopper 40 or the seating portion 15, is increased, and as a result, it is possible to inhibit the occurrence of rattling noise.

That is, when large displacement vibration is inputted, the stopper 40 and the seating portion 15 serve to inhibit the hydraulic liquid from flowing through the fastening hole 31 and the slits 32 of the membrane 30 (and suppress elastic behavior of the membrane), and as a result, it is possible to increase durability of the membrane 30.

For reference, as the fastening device 50 for fixing the stopper 40, a publicly known device in the related art, such as a bolt, a rivet, or a caulking, may be used, and a diameter of the stopper 40 and sizes and shapes of the fastening hole 31 and the slits 32 may be set and tuned through repeated experiments in accordance with required performance.

The present invention having the aforementioned configurations is made by collecting only the advantages of a semifixed membrane and an integrated membrane, and as a result, it is possible to improve dynamic characteristics, increase NVH performance, and inhibit the occurrence of abnormal noise.

It is possible to inhibit the occurrence of abnormal noise and increase damping performance by blocking or allowing the flow of the hydraulic liquid (via the membrane) in accordance with an operating state of the engine and/or a traveling state. Further, the membrane 30 may be easily and elastically deformed since the slits 32, which extend from the fastening hole 31, are additionally provided, and it is possible to inhibit the slit 32 from being additionally torn since the rib 33 is formed to surround the slits 32.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A nozzle plate of an engine mount, which is mounted in the engine mount in which a hydraulic liquid is encapsulated, and divides an interior of the engine mount into an upper liquid chamber and a lower liquid chamber, the nozzle plate comprising:
   a lower nozzle plate which has a lower stepped portion formed to be spaced apart from a flow path groove toward a center of the lower nozzle plate, a seating portion formed to be spaced apart from the lower stepped portion toward the center of the lower nozzle plate, and a protrusion portion protruding from the seating portion,
   an upper nozzle plate which has a ring shape formed with an opening hole at a center of the upper nozzle plate, has an upper stepped portion, and is coupled to the lower nozzle plate from an upper side of the lower nozzle plate to cover an upper side of the flow path groove and form a flow path,
   a membrane which has an outer rim portion engaged between the upper stepped portion and the lower stepped portion, a central portion seated on the seating portion, and a fastening hole into which the protrusion portion is fitted when the central portion is seated on the seating portion, and
   a stopper which is coupled to the protrusion portion and prevents the membrane from being withdrawn,
   wherein a flow of the hydraulic liquid is allowed through a gap formed between the stopper and the membrane and a gap formed between the membrane and the seating portion when pressure of the hydraulic liquid applied to the membrane is lower than a predetermined pressure, and a flow of the hydraulic liquid is blocked as the membrane comes into close contact with the stopper or the seating portion when the pressure of the hydraulic liquid is higher than the predetermined pressure, and
   wherein a slit is additionally formed at an edge of the fastening hole so that the membrane is elastically deformed in accordance with the pressure of the hydraulic liquid.

2. The nozzle plate of claim 1, wherein two or more slits are disposed to extend radially with the fastening hole disposed at a center thereof.

3. The nozzle plate of claim 1, wherein a rib with a partially increased thickness is formed to surround the slit and the fastening hole disposed therein.

4. The nozzle plate of claim 1, wherein a first catching projection on which the membrane is seated is formed around the protrusion portion, and a second catching projection on which the stopper is seated is formed at an upper end of the protrusion portion.

5. The nozzle plate of claim 4, wherein the stopper has a circular plate shape having a through hole formed at a center thereof, and when the stopper is seated on the second catching projection, a fastening device is coupled and fixed to an end of the protrusion portion.

6. The nozzle plate claim 1, wherein lower opening holes are formed in the lower nozzle plate in a direction from the lower stepped portion to the center of the lower nozzle plate, and the seating portion is positioned at a center of the lower opening holes and connected with the lower stepped portion through bridges that extend radially from the seating portion.

7. The nozzle plate of claim 1, wherein a plurality of protrusions is formed on a portion of the lower nozzle plate where the upper nozzle plate and the lower nozzle plate are in direct contact with each other, and protrusion holes are formed in the upper nozzle plate so that the protrusion holes and the protrusions are fitted with and coupled to each other.

8. The nozzle plate of claim 7, wherein when the protrusions are fitted into the protrusion holes, the membrane is engaged between the upper stepped portion and the lower stepped portion so that the membrane is elastically compressed.

9. The nozzle plate of claim 1, wherein a part of the membrane, which is positioned between the stopper and the seating portion among parts of the membrane, has a tapered shape which has a thickness that decreases toward the center of the membrane.

10. The nozzle plate of claim 1, wherein a part of the membrane, which is positioned between the stopper and the seating portion among parts of the membrane, has a shape formed with a stepped portion which has a small thickness at a portion relatively close to the center of the membrane and a large thickness at a portion relatively distant from the center of the membrane.

* * * * *